Dec. 20, 1960   L. A. KINGSLEY   2,964,867
IMPRINTING OF PERFLUOROCARBON POLYMERS
Filed Dec. 18, 1957   3 Sheets-Sheet 1

INVENTOR.
LEWIS A. KINGSLEY
BY
ATTORNEYS

INVENTOR.
LEWIS A. KINGSLEY

United States Patent Office 2,964,867
Patented Dec. 20, 1960

---

2,964,867

IMPRINTING OF PERFLUOROCARBON POLYMERS

Lewis A. Kingsley, Beverly Hills, Calif. (% Kingsley Stamping Machine Co., 850 Cahuenga Blvd., Hollywood 38, Calif.)

Filed Dec. 18, 1957, Ser. No. 703,542

9 Claims. (Cl. 41—26)

This invention relates to the imprinting of plastic materials and has particular reference to a method and article for imprinting fluorocarbon polymeric materials.

Fluorocarbon polymers are highly inert and stable and are both oleophobic and hydrophobic, being repellent to, or non-wettable by oils as well as water. They are passive towards inks, dyes and adhesives. Typical fluorinated polymers having these properties include polymerized 1,1-dihydroperfluoroalkyl acrylates as described in U.S. Patent No. 2,642,416; polymerized fluorocarbon vinyl esters as described in U.S. Patent No. 2,592,069; and polymerized perfluoro olefins, particularly polytetrafluoroethylene. Thus, while the fluorocarbon polymers have exceptional physical and electrical properties suiting them for many applications, the passivity of the surfaces thereof seriously limits their full utilization. Such is the case when these resins are used for the outer insulating covering of high temperature resistant electrical cables. Such applications generally require the imprinting of the coated surface with coding numbers and the like, but heretofore the nature of the surface of the fluorocarbon resins has rendered such imprinting virtually impossible without the use of specially designed printing equipment and/or excessively high printing temperatures.

One of the principal objects of this invention is to provide a novel method and article for imprinting the surfaces of fluorocarbon polymers, and a novel method and apparatus for producing such an article.

Another object of this invention is to provide a process for permanently marking electrical cables having a fluorocarbon polymer insulating covering using wire stamping machines of the type disclosed in U.S. Patent No. 2,517,443.

A further object of the present invention is to provide a novel form of roll leaf hot stamping foil useful in the stamping of fluorocarbon polymer surfaces.

Other objects and advantages of this invention it is believed will be readily apparent from the following detailed description of preferred embodiments thereof when read in connection with the accompanying drawings.

It is known that fluorocarbon polymers will react chemically at elevated temperatures and pressures with any of the molten alkali metals, causing a dark brown discoloration of the outer surface of the normally white polymer.

Briefly, this invention comprehends within its scope the discovery that an alkali metal can be incorporated in a roll leaf hot stamping foil and utilized as such in a wire stamping machine to imprint or discolor fluorocarbon polymer surfaces in conformity with the outlines of the marking type or dies used. Thus, the novel article of this invention comprises a ribbon or sheet including a relatively thin layer or film of an alkali metal supported on a suitable carrier sheet or film. Due to the inherent reactivity of the alkali metals it has been found necessary to protect the alkali metal with an air-impervious coating of a material which is inert to reaction with the alkali metals. Paraffin wax is preferred, although other relatively high-melting waxes and wax-like materials and other materials may be used. The material forming the carrier strip may be varied within wide limits. Cellophane is preferred, but other resin films such as "Mylar"; metallic foils and films such as aluminum; and even materials such as glassine paper may be used. Sodium is the preferred alkali metal, but any of the other alkali metals, i.e., lithium, potassium, rubidium, cesium, and francium may be used. Moreover, although less suitable, the alkaline earth metals, as well as manganese and zinc can also be used.

Figure 1:
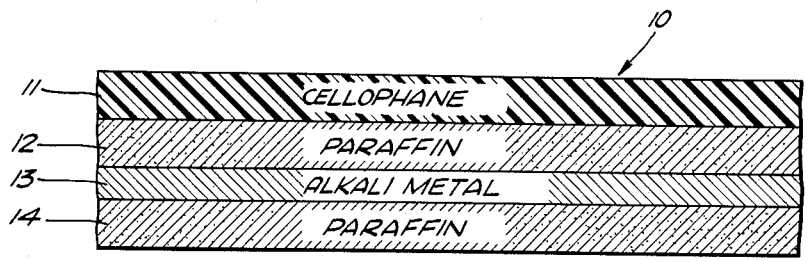
Figure 1 is a sectional elevation, on a greatly enlarged scale of a stamping foil constructed in accordance with the present invention.

Referring now to the drawings, a preferred form of stamping foil article, generally indicated 10, is illustrated in Figure 1. This article comprises a continuous, relatively narrow and thin ribbon including a carrier strip 11 of cellophane, a layer 12 of paraffin thereon, a film 13 of metallic sodium overlying the paraffin, and a second layer 14 of paraffin overlying the sodium film.

Figure 2:
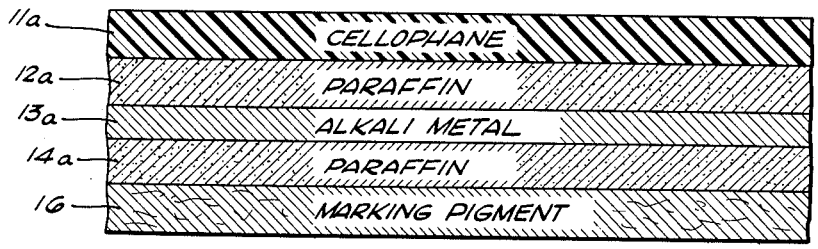
Figure 2 is a sectional elevation of a modified form thereof.

The modified form of the invention shown in Figure 2 is substantially the same as the article of Figure 1, having a carrier strip 11a, a layer 12a of paraffin, a film 13a of sodium and a layer 14a of paraffin, but here a layer 16 of marking pigment is included, overlying the paraffin layer 14a. The marking pigment is any conventional one used in conventional roll leaf hot stamping foil and as such may comprise powdered metals, carbon black, chromium dioxide, titanium dioxide and the like, formulated with various shellacs or other gums, alcohol, toluol, glycerine and the like to provide a transferable film. In the use of the article shown in Figure 2 the reaction between the sodium and the fluorocarbon polymer renders the surface of the polymer susceptible to retention of the marking pigment.

Figure 3:
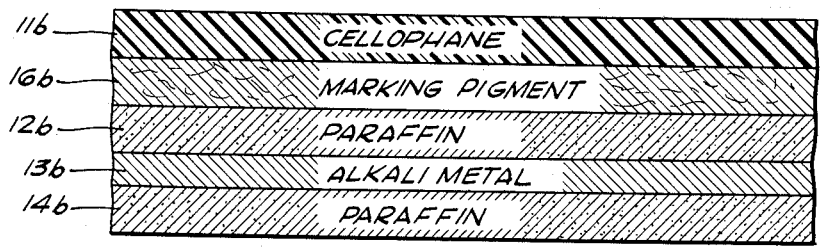
Figure 3 is a sectional elevation of a further modified form thereof.

The further modified form of the invention shown in Figure 3 is substantially the same as that in Figure 2. This article comprises a cellophane carrier strip 11b, paraffin layers 12b and 14b, sodium film 13b and marking pigment 16b. Here, however, the marking pigment is interposed between the cellophane and the paraffin layer 12b.

In producing the novel roll leaf stamping foil articles of the present invention it is preferred to apply the alkali metal to the wax covered carrier strip by means of the vacuum plating process. The use of the vacuum technique permits the application of extremely thin and uniform films and thus, in use, enables the actuation and deterioration of the fluorocarbon polymer surface to be controlled within safe limits. However, the alkali metal may be applied in some other manner such as in molten, powder or sheet form.

Figure 4:
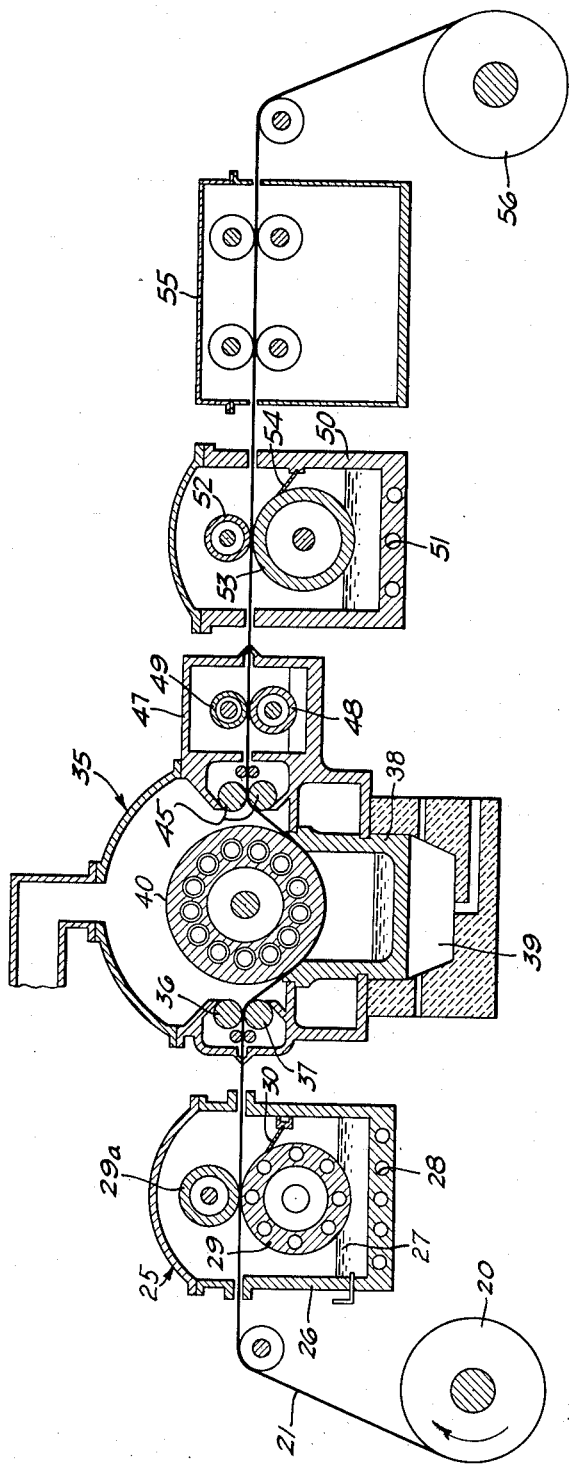
Figure 4 is a diagrammatic side elevation of an apparatus for producing the stamping foil of this invention.

A continuous apparatus for producing the alkali metal-containing foil or film is shown in Figure 4. This apparatus includes a carrier strip roll 20 from which the carrier strip 21 is continuously fed to a wax-applying apparatus 25. This apparatus includes a reservoir 26 for the wax 27, the reservoir being provided with suitable heating means 28 for maintaining the wax in a molten condition. The reservoir is provided with a transfer cylinder 29 and a feed cylinder 29a between which the carrier strip is passed. A doctor blade 30 is provided to bear against the surface of the cylinder 29 to remove excess wax carried thereon.

The carrier strip, now having on one surface thereof a layer of paraffin or the like, is then fed to the vacuum chamber 35, the entrance thereto being sealed by suitable means including a pair of cylinders 36 and 37 which also serve to feed the strip into the chamber. A high vacuum is maintained in the chamber by the conventional means (not shown) and the chamber is provided with a crucible 38 for the molten alkali metal to be evaporated. The crucible is heated by means of the gas firebox 39 as shown, or it may be heated in any other suitable manner. A removable crucible located inside the vacuum chamber could also be used. The wax-coated carrier strip is passed through the chamber in contact with a cooling roller 40 having conduits therein for a coolant fluid such as water or other suitable fluid.

The strip, now containing a film of metallic alkali metal over the wax coating, passes out of the chamber between the rolls 45 and thence through a molten wax reservoir 47 where a coating of wax is applied over the alkali metal coating by means of transfer roll 48 and feed roll 49. The strip then passes through a pigment composition reservoir 50 provided with heating means 51, wherein the strip is coated with the pigment composition by means of a feed roll 52, transfer roll 53 and doctor blade 54. The strip is dried in a drying chamber 55 and wound on a take-up roll 56. It will be understood that the ribbon made in this manner will be substantially the same as that shown in Figure 1.

Figure 5:
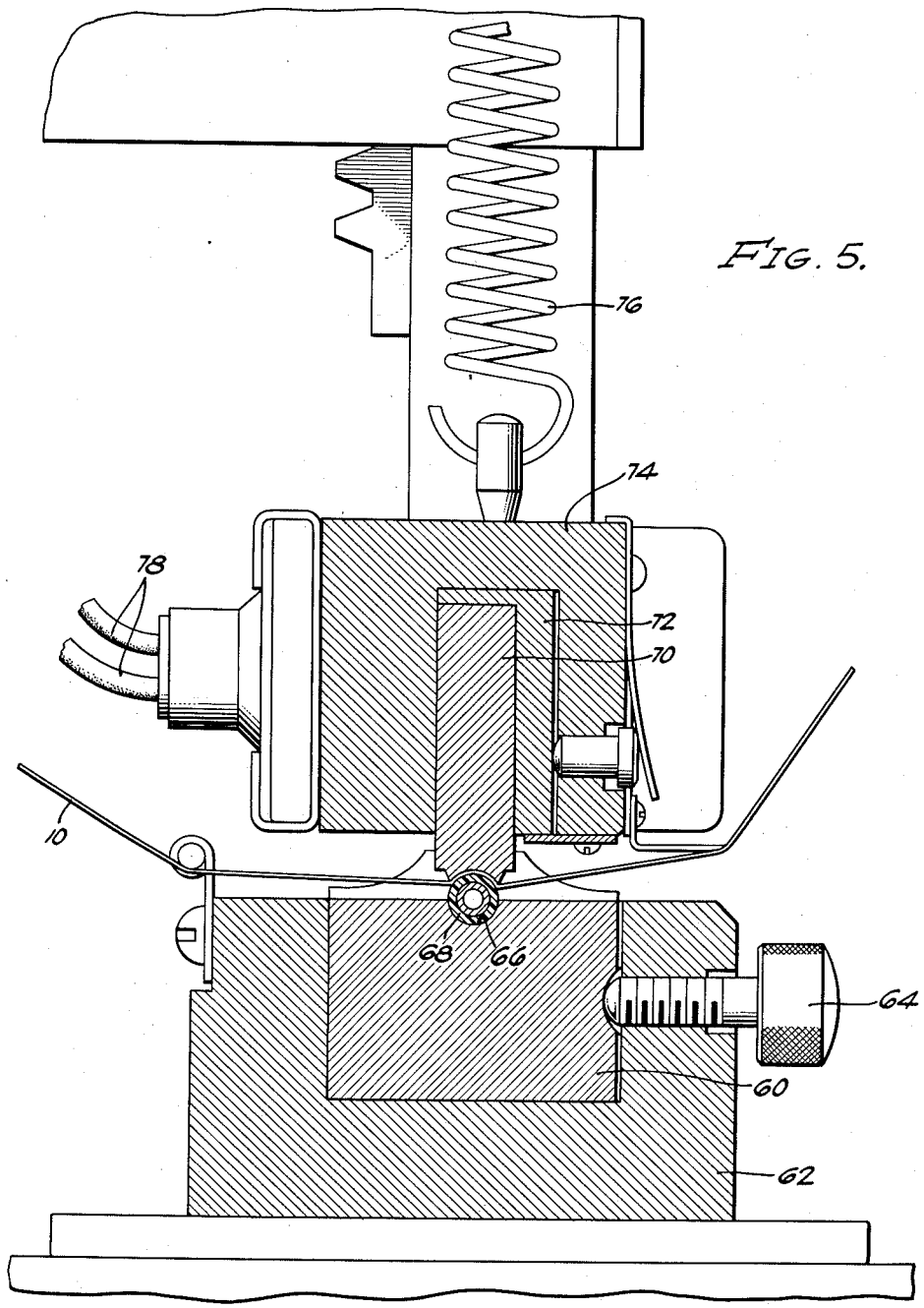
Figure 5 is a side elevation, partly in section, of a wire stamping machine used in marking polyfluorocarbon-covered wire.

The use of the article of this invention is illustrated in Figure 5. The stamping machine shown therein has an anvil 60 mounted in a suitable block 62 held there by a set screw 64 and having a groove 66 in the upper face of the anvil for receiving a wire 68 to be stamped.

Type 70 is held in type holder 72 mounted in reciprocal blocks 74 which is urged upwardly by spring 76. The type is heated through electrical wires 78 and the foil 10 is trained between type 70 and wire 68. Thus, when the type is lowered to the position seen in Figure 5 it, being heated above the melting point of the alkali metal on foil 10, causes the paraffin and the alkali metal to be melted and inter-mixed, along with the marking pigment if used, and the mixture is deposited on the surface of the fluorocarbon polymer insulation of the wire 68. The reaction between the alkali metal and the polymer surface is, under the conditions of pressure and temperature, virtually instantaneous, so that the polymer surface is discolored in the areas conforming to the particular type used, thus causing the surface to be printed with the desired indicia.

As a specific example of the process of this invention, a cellophane carrier strip is provided with a coating of paraffin wax on one side. This coated strip is supported in a highly evacuated container heated to about 350° F. and the coated side subjected to the action of sodium vapor. The vapor is provided by evaporation of sodium metal from a suitable crucible located closely adjacent the strip and within the vacuum chamber, the crucible being electrically heated. The strip is then removed from the chamber and a layer of paraffin wax immediately applied over the film of sodium metal deposited on the strip.

The stamping foil thus produced was used in printing on a wire having an outer sheath of fused polytetrafluoroethylene. The stamping machine used was like that shown in Figure 5. The stamping temperature was 250° F.

While the article of this invention is particularly useful in the stamping or printing of wire covered with a fluorocarbon polymer, it is not intended to so limit its use since the extreme reactivity of the alkali metals would indicate its usefulness in the marking of other materials.

Having fully described my invention, it is to be understood that I do not wish to be limited to the details set forth, but my invention is of the full scope of the appended claims.

I claim:

1. As an article of manufacture, a carrier strip and a layer of an alkali metal carried thereon, said alkali metal being provided with a protective coating.

2. As an article of manufacture, a carrier strip and a layer of an alkali metal carried thereon, said alkali metal being provided with a protective coating of paraffin.

3. A roll leaf hot stamping foil comprising: a carrier strip, a layer of wax thereon, a film of an alkali metal overlying said wax layer, and a second layer of wax overlying said alkali metal film.

4. A roll leaf hot stamping foil comprising: a carrier strip, a layer of wax thereon, a film of an alkali metal overlying said wax layer, and a second layer of wax overlying said alkali metal film, said foil also including a marking pigment.

5. A roll leaf hot stamping foil comprising: a cellophane carrier strip, a layer of paraffin wax thereon, a film of sodium metal overlying said paraffin wax layer, and a second layer of paraffin wax overlying said sodium metal film.

6. A roll leaf hot stamping foil comprising: a cellophane carrier strip, a marking pigment carried thereby, a layer of paraffin wax overlying said marking pigment, a film of sodium metal overlying said paraffin wax layer, and a second layer of paraffin wax overlying said sodium metal film.

7. A roll leaf hot stamping foil comprising: a cellophane carrier strip, a layer of paraffin wax thereon, a film of sodium metal overlying said paraffin wax layer, a second layer of paraffin wax overlying said sodium metal film, and a marking pigment layer overlying said second paraffin wax layer.

8. A process for marking a fluorocarbon polymer surface which comprises interposing the article of claim 1 between said surface and a marking die, heating said die to a temperature above the melting point of said alkali metal, and applying pressure to said article and said surface with said die.

9. A process for marking a fluorocarbon polymer surface which comprises interposing the article of claim 5 between said surface and a marking die, heating said die to a temperature above the melting point of said sodium metal, and applying pressure to said article and said surface with said die.

References Cited in the file of this patent

UNITED STATES PATENTS

| | | |
|---|---|---|
| 254,877 | Knox | Mar. 14, 1882 |
| 1,867,224 | Lange | July 12, 1932 |
| 2,175,492 | Swift | Oct. 10, 1939 |
| 2,413,606 | Colbert et al. | Dec. 31, 1946 |
| 2,416,844 | Reese | Mar. 4, 1947 |
| 2,517,493 | Kingsley | Aug. 1, 1950 |
| 2,557,584 | Wishart et al. | June 19, 1951 |
| 2,635,974 | Terry | Apr. 21, 1953 |
| 2,644,262 | Schoenberg et al. | July 7, 1953 |
| 2,693,167 | Fox et al. | Nov. 2, 1954 |
| 2,724,663 | Bond | Nov. 22, 1955 |
| 2,789,063 | Purvis et al. | Apr. 16, 1957 |